Oct. 2, 1951 R. J. WHALEN ET AL 2,569,840

RECORD FEEDING AND RECORDING APPARATUS

Filed Sept. 16, 1949 6 Sheets-Sheet 1

INVENTORS
RICHARD J. WHALEN
STANLEY T. KULPA
BY George D. Hicks
ATTORNEY

Oct. 2, 1951 R. J. WHALEN ET AL 2,569,840

RECORD FEEDING AND RECORDING APPARATUS

Filed Sept. 16, 1949 6 Sheets-Sheet 2

INVENTORS
RICHARD J. WHALEN
STANLEY T. KULPA
BY George D. Hicks
ATTORNEY

INVENTORS
RICHARD J. WHALEN
STANLEY T. KULPA
BY George D. Hicks
ATTORNEY

RECORD FEEDING AND RECORDING APPARATUS

INVENTORS
RICHARD J. WHALEN
STANLEY T. KULPA
BY
George D. Hicks
ATTORNEY

INVENTORS
RICHARD J. WHALEN
STANLEY T. KULPA
BY George D. Hicks
ATTORNEY

INVENTORS
RICHARD J. WHALEN
STANLEY T. KULPA
BY
ATTORNEY

Patented Oct. 2, 1951 2,569,840

UNITED STATES PATENT OFFICE 2,569,840

RECORD FEEDING AND RECORDING APPARATUS

Richard J. Whalen and Stanley T. Kulpa, Poughkeepsie, N. Y., assignors to International Business Machines Corporation, New York, N. Y., a corporation of New York Application September 16, 1949, Serial No. 116,104

5 Claims. (Cl. 235—61.11)

This invention relates to improvements in apparatus for manifesting data which is recorded in source records as data-representing designations, and it has for a general object to provide apparatus of this type which is of improved construction and arrangement of parts.

Apparatus of the above type usually comprises a guide means providing a record feeding and sensing passage, an initial card feeding means which operates to feed the records one at a time to an initial sensing position in such passage, and a record sensing means which operates to successively sense the record areas of the source record for the purpose of controlling the operation of a means for manifesting the sensed data-representing designations. It is important in apparatus of this type that the source record be properly positioned at the beginning of the sensing operation so that the data will be manifested without error and in a predetermined desired way.

It is a further and more specific object of the present invention to provide new and improved apparatus of the type referred to wherein upon failure of the source record to be properly positioned at the beginning of the sensing operation, further normal operation of the apparatus is automatically prevented.

According to one of its specific aspects, the present invention is described in the detail description to follow and is shown in the accompanying drawings as being embodied in the selectively controlled recording apparatus disclosed in the copending U. S. patent application of Francis E. Hamilton, Maxwell F. Hayes, and John D. Wolfe, Serial No. 26,624, filed May 12, 1948, which now is Patent No. 2,540,030, issued January 30, 1951.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1*a* and 1*b* when arranged with Fig. 1*b* at the right and above, constitute together an isometric view showing diagrammatically those portions of the read unit disclosed in the above identified copending application of Hamilton et al., which are necessary to an understanding of the preferred embodiment of the invention disclosed herein.

Figure 6A:
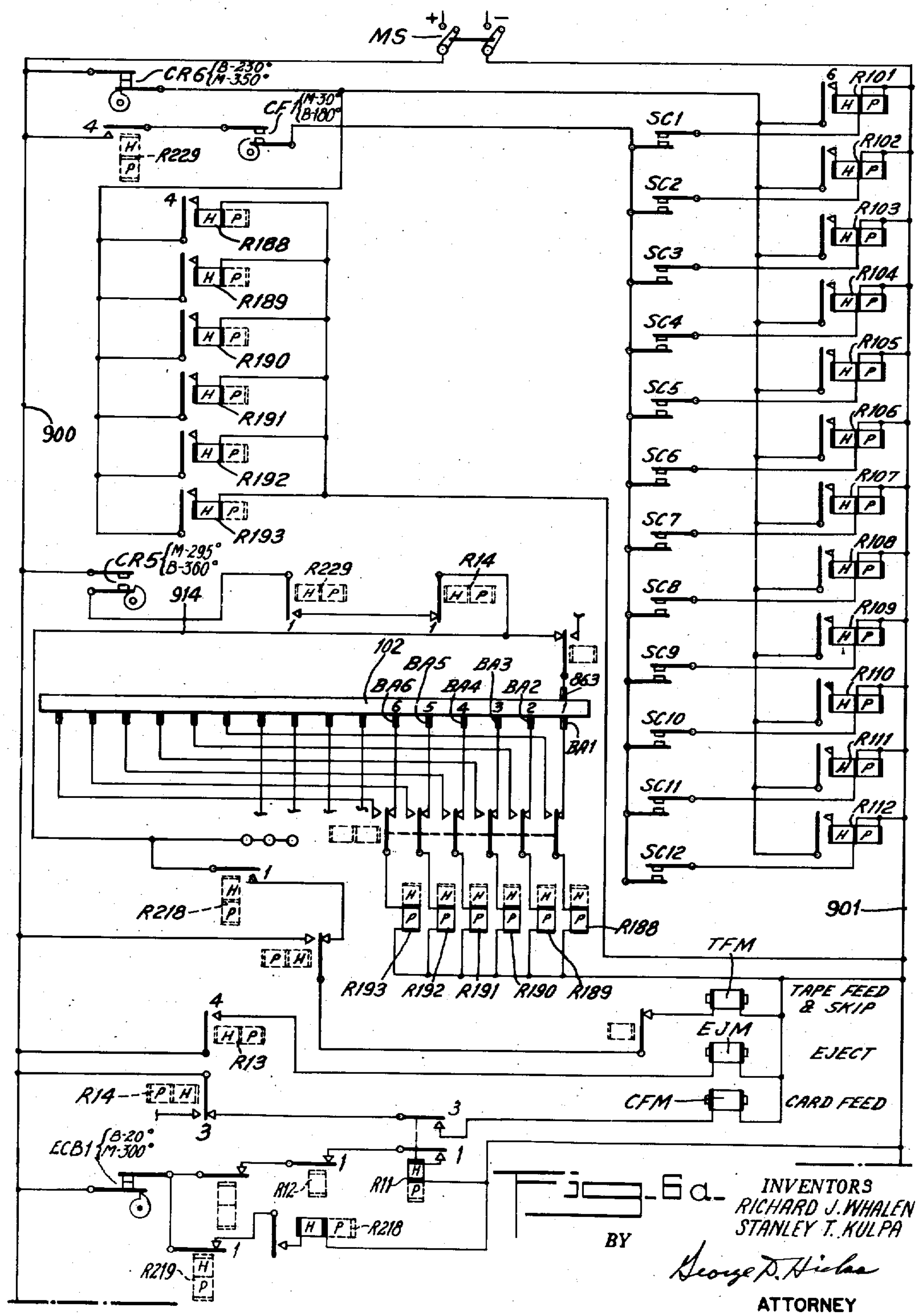
Figure 6B:
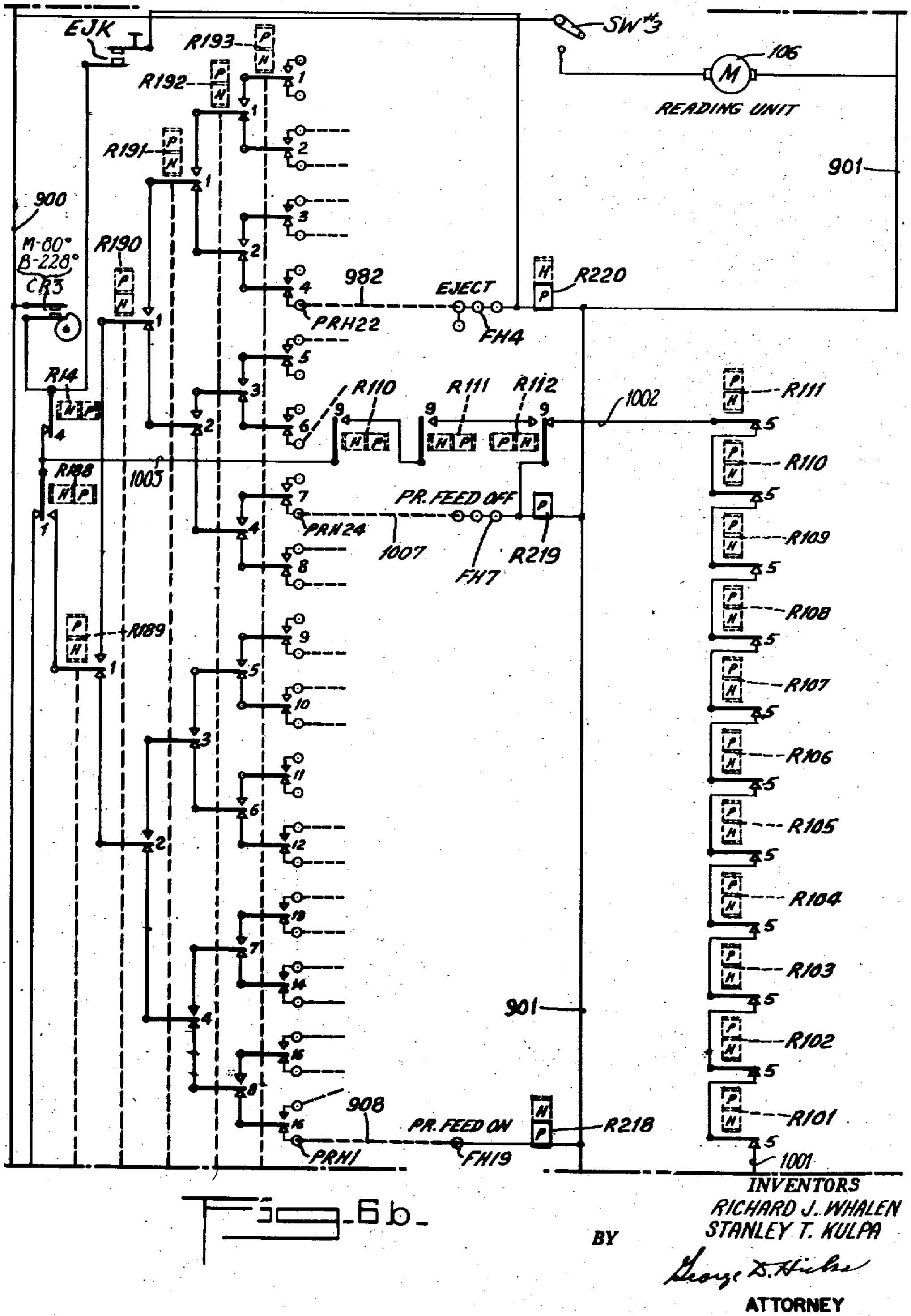
Figure 6C:
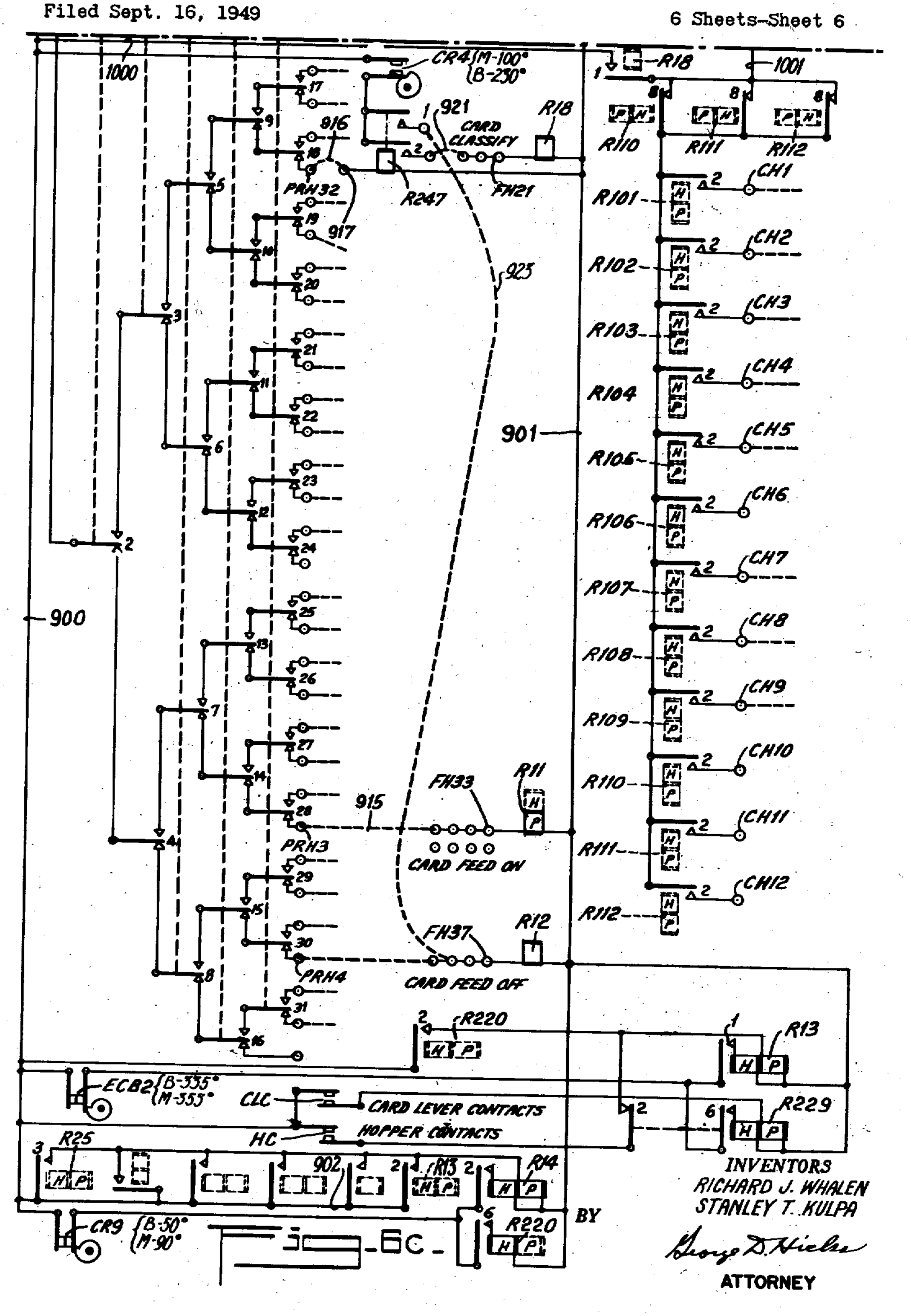

Figs. 6*a*, 6*b*, and 6*c* when arranged in sequence and in end-to-end relation comprise an electrical wiring diagram showing the electrical instrumentalities and circuit connections used herein to disclose the present invention.

As indicated above, the preferred embodiment of the present invention is disclosed herein as an improvement in the control mechanism for the apparatus shown in the copending application of Hamilton et al. It will be appreciated, however, that, in so far as certain of its broader aspects are concerned, this invention may be embodied in a variety of other record controlled apparatus. In the present drawings, the parts shown which are the same as those shown in the Hamilton et al. application, referred to, are indicated by the same reference characters as are used in such application. Only those parts of the Hamilton et al. disclosure which are essential to an understanding of the present invention have been included herein.

The general purpose of the apparatus disclosed is to manifest in a predetermined manner and without error the data recorded in source record cards as data-representing code designations. This is accomplished under the combined control of the code designations in the record columns of the cards and of control designations recorded in a predetermined manner in a program tape. The specific instrumentalities used for manifesting the data have been omitted from the present application as a detail disclosure thereof is not considered as being essential to an understanding of the present invention. In the copending application of Hamilton et al. these manifesting instrumentalities are disclosed as two typewriters which function to print selected data on different form sheets in a predetermined manner.

Figures 2, 3, 4, 5:
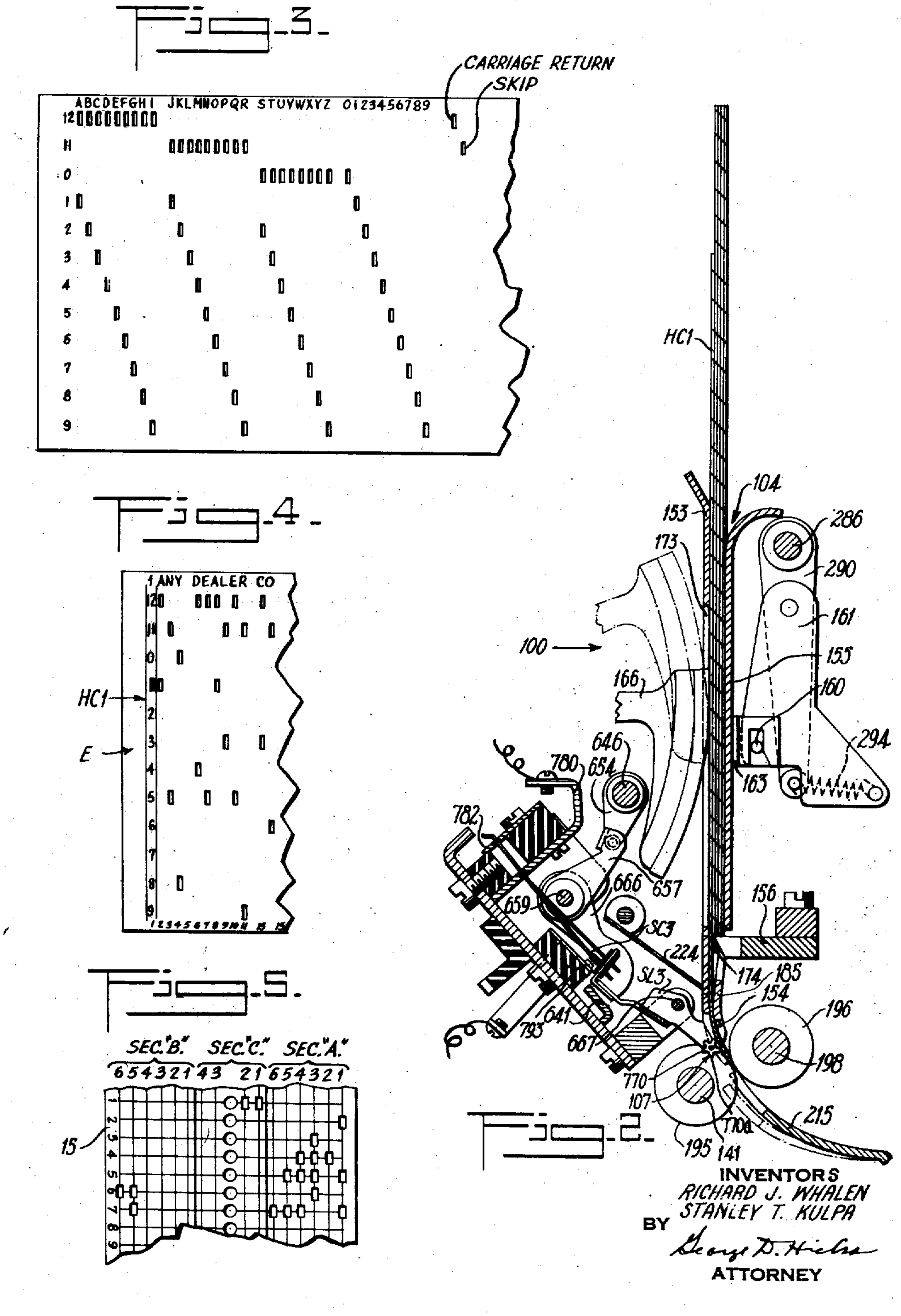
Fig. 2 is an enlarged fragmentary vertical section showing more in detail the record sensing means and also the passage through which record cards are fed.
Fig. 3 is a fragmentary view of a conventional type of record card in which is punched the code designations of a 12-position code system used in electric accounting machines of a well-known type.
Fig. 4 is a fragmentary view showing a portion of a record card in which is recorded certain selected data for the purposes of explaining the present invention.
Fig. 5 is a fragmentary view showing a portion of a program tape in which is punched code designations which are used to control operations of the apparatus according to a predetermined plan.

*The source record.*—In Fig. 3 of the drawings, there is shown a fragment of a source record card in which is punched all of the code designations of a well-known 12-position code system which is used in recording the data in the source record cards. The code system shown will be recognized as that which is customarily used for recording alphabetic and numeric data for use in a commercially known electric accounting machine system. Each datum is represented by a punched code hole in one or more index point positions in a vertical column of 12 such positions. The location of the index point positions composing each of the record columns is represented by the vertical row of figures along the left-hand margin of the card. The data punched in the several record columns of the card in Fig. 3 is interpreted, respectively, by the characters appearing horizontally across the top of the card. For example, the character "A" is represented in the extreme left-hand column by a code hole in the #12 index point position and a second code hole in the #1 index point position.

In Fig. 4, there is shown a fragment of a source record card containing data selected for explaining the present invention. The card is indicated by the reference character HC-1 and the recorded data is interpreted by characters along the top edge of the card. The numbers along the bottom edge of the card indicate, respectively, the location of the record columns thereof. While the cards may contain any desired number of record columns, a complete card of the type shown contains 80 columns. The card HC-1 is the same as the record card appearing in Fig. 31 of the Hamilton et al. application, referred to, and is included herein as being representative of the type of records containing source data which may be used in the operation of the preferred embodiment of the present invention.

Figure 1A:
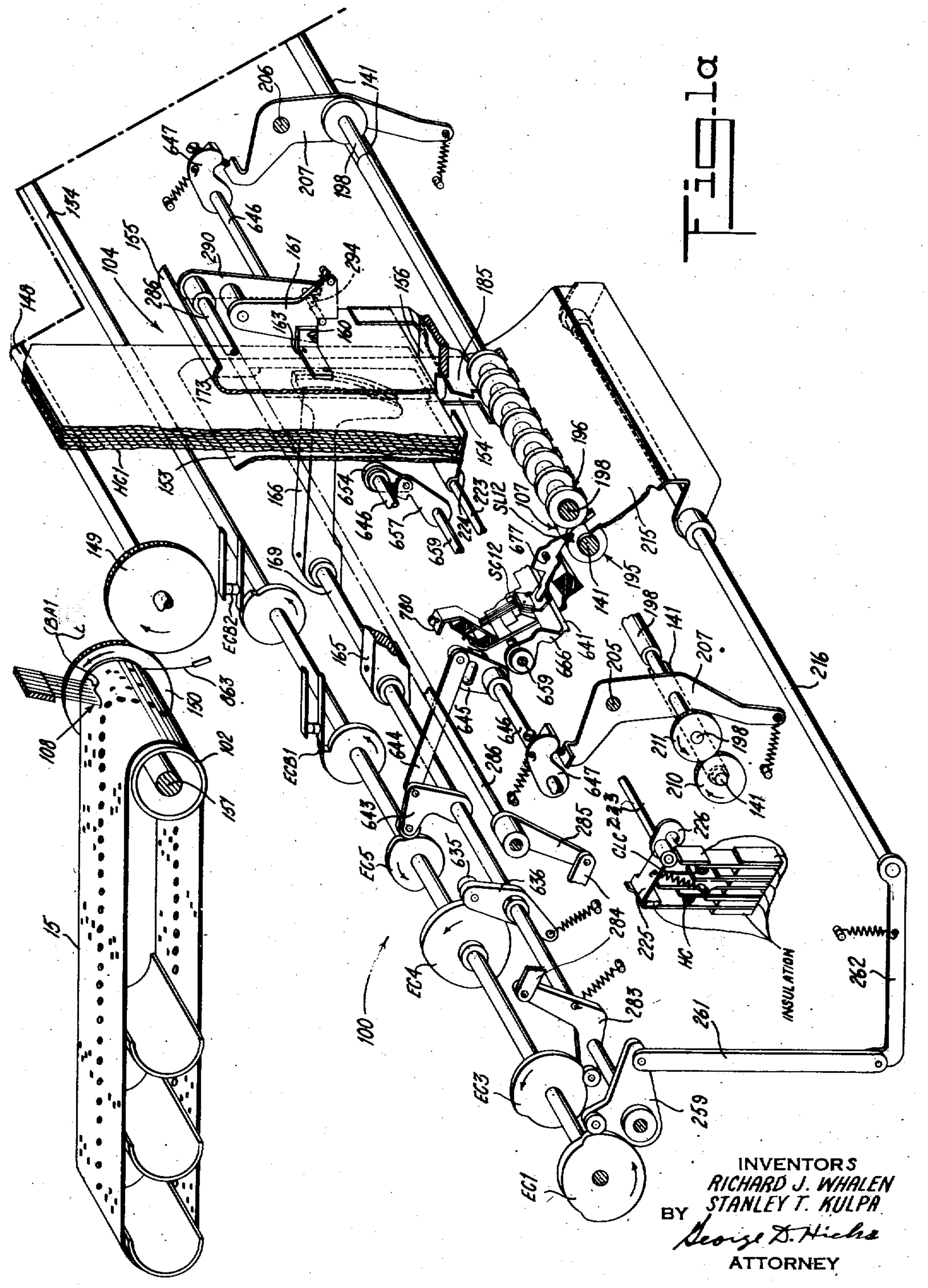

*Program control tape.*—Fig. 5 of the drawings shows a fragment of a program tape 15 which is used herein to control the sequence of operations of the apparatus according to a predetermined plan. The entire tape is in the form of a loop as indicated in Fig. 1*a*, and contains the control code designations for effecting the various required operations of the apparatus. The tape 15 is a portion of the same tape as that disclosed in Fig. 47 of the Hamilton et al. application, referred to. In Fig. 5, hereof, only the part of the tape 15 is shown which controls the first few operations of the apparatus, because a description only of the initial operations is required for an understanding of the present invention. As shown in Fig. 5, the tape 15 is divided longitudinally into three different sections identified, respectively, as sections "A," "B," and "C." Each control designation comprises a code hole or holes punched in a column of index point positions of a section according to a predetermined combinational hole code system. The numerals across the top of the tape 15 indicate the index point or code positions of the columns in the three sections. Corresponding columns in the three sections are aligned transversely of the tape and the row of numerals along the left-hand edge of the tape identify the corresponding columns in the three sections. The manner in which the operation of the apparatus is controlled by the control designations in the tape 15 will be apparent from the description of the operation contained hereinafter.

Figure 1B:
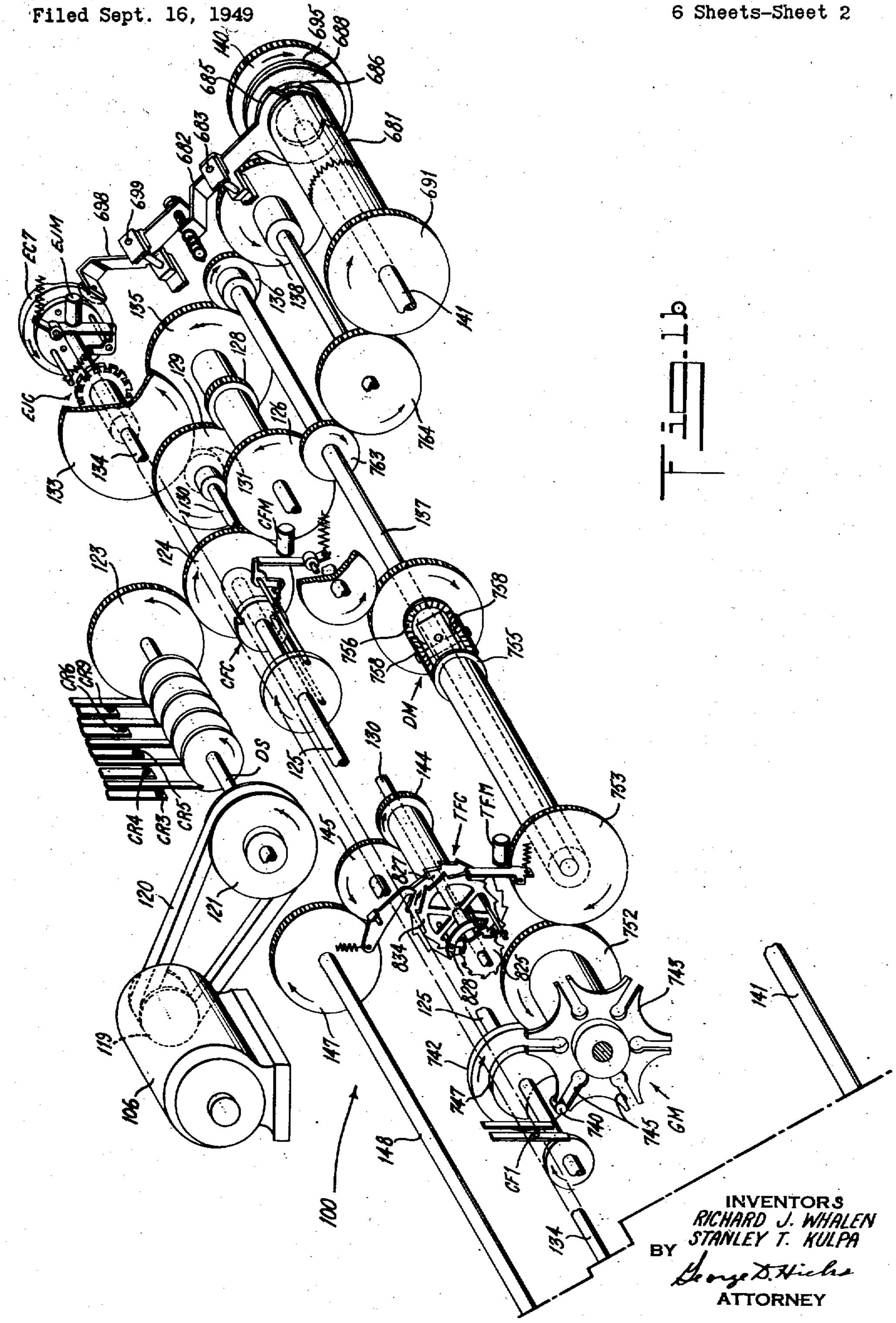

*Record feeding passage.*—Referring now in detail to the read unit 100 which is shown in Figs. 1*a* and 1*b*, source record cards of the type shown in Figs. 3 and 4 are placed in a hopper 104 and so that their #1 record columns are at the bottom of the hopper and their #12 index point positions are at the left when viewed as in Fig. 1*a*. For the purposes of this description, it will be assumed that the card HC-1 of Fig. 4 is the rearmost card in the hopper 104.

The hopper 104 is defined at its rear by a fixed vertical wall or plate 153 and at its front by a movable vertical wall or plate 155. At the time the cards are first placed in the hopper 104 the movable wall 155 is positioned to the right or forwardly so that the cards may be easily inserted. The rear wall 153 is provided with a pair of rectangular openings 173 through which extend the concave shaped friction faces of a pair of card feed sectors 165 and 166, respectively. In Fig. 1*a* only one of the rectangular openings 173 is shown in dotted lines and the friction face of the sector 166 is shown as extending therethrough. Only a part of the sector 165 appears in Fig. 1*a*. The sectors 165 and 166 are shown as fixed to a transverse shaft 169. A fixed bottom member 156 for the hopper 104 is provided at its rear with a knife-like edge which defines the forward edge of a throat 174 (see Fig. 2) through which the rearmost card in the hopper is fed downwardly as will presently appear.

The rear wall or plate 153 extends downwardly below the throat 174 and the forward face of this lower extension provides a guide surface for each source record card as it is fed downwardly from the hopper 104. The upper or forward face of a card stop plate 215 when the latter is in its normal position, shown in full lines in Fig. 1*a* and in dotted lines in Fig. 2, provides a downward continuation of the card guide surface of plate 153. A fixed guide plate 185 is arranged at the forward side of the lower extension of plate 153 and provides with the latter, and the stop plate 215 when in its normal position, a feed passage 154 for the record cards.

A pair of card feed rolls 195, 196 are arranged, respectively, on opposite sides of the card feed passage 154 and between the lower end of the plate 153 and the upper end of plate 215. Each roll comprises a plurality of discs mounted in spaced relation on a roll shaft. The lower edge of the plate 153 and upper edge of plate 215 are each provided with a plurality of spaced slots which receive, respectively, the several discs of the two feed rolls. The discs of feed roll 195 are fixed on a roll drive shaft 141 and the discs of roll 196 are fixed on a roll shaft 198 and the shafts are operatively connected by spur gears 210 and 211. The two ends of shaft 198 are journalled in levers 207 which are pivoted on studs 205 and 206. As will presently appear, the levers 207 are rotated counterclockwise a slight amount each time a new card is fed into the passage 154 so as to move the roll 196 a small amount away from the roll 195 and thereby permit the leading edge of the new card to be fed between the rolls. This movement of the roll 196 away from roll 195 is not enough to unmesh the gears 210, 211. At the end of the operation of feeding the new card into the passage 154, the levers 207 are moved clockwise to return the roll 196 into card gripping and feeding relation with the roll 195.

*Sensing means.*—The record columns of the card in the passage 154 are sensed successively at a sensing station which is indicated generally at 107 (Fig. 2). The sensing of the record column at the sensing station is effected by a row of separate sensing elements of the star wheel type extending in a line at the rear side of the passage 154. The sensing elements correspond in number and position to the index point positions of a record column and each such sensing element controls the opening and closing of an individual related sensing contact. In Fig. 1*a*, there is shown the sensing element and its related sensing contact for sensing the #12 index point position of the record column at the sensing station 107 and in Fig. 2 there is shown the sensing element and its related sensing contact for sensing the #3 index point position. The remaining sensing elements are identical in construction and they have not been shown as it would be mere duplication. All twelve sensing contacts appear diagrammatically in Fig. 6*a* and are identified, respectively, by the reference numerals SC1 to SC12.

Referring to Fig. 2, the sensing element shown comprises a sensing lever SL3 pivoted on a rod 667 and carrying at one end thereof a star-shaped wheel 770 having rounded sensing points 770*a*. The lever SL3 is connected at its other end to a group of contact wires forming the movable element of the sensing contact SC3. The fixed contact element of SC3 comprises a plate having a contact ridge 793 extending beneath the group of contact wires and adapted to be contacted thereby to close a related circuit. The ridge 793 is common to all groups of contact wires composing the sensing contacts. Each group of wires is electrically connected to an individual strap 780 which is in turn connected to a related circuit wire. The groups of contact wires are formed of spring stock and are anchored to a plate 782 of insulating material in such a manner that they are constantly urged in a direction to engage the ridge 793 and to move the related sensing lever counterclockwise and its star wheel into sensing engagement with a card in the passage 154. If there is no code hole in the corresponding index point position of the column in sensing position two points 770*a* will engage the card and straddle the column being sensed and thereby prevent its related group of wires from contacting the common contact element 793. When the card moves to bring a record column into sensing position and the corresponding index point position contains a code hole, a point 770*a* will engage and enter such code hole and thereby permit the sensing lever to move far enough counterclockwise to permit closing of its related sensing contact. At certain times in the operation, all star wheels sensing elements are moved out of sensing relation to the card by a bail 641, which is carried by arms 666 fixed to a shaft 659. The bail 641 is moved counterclockwise into engagement with the sensing levers and thereby moves such sensing levers clockwise from the position shown. The manner in which this is effected and the purpose thereof will be presently explained.

*Feeding of record to initial sensing position.*—The read unit 100 is provided with a mechanism which functions, each time it operates, to feed the rearmost card in hopper 104 downward through the throat 174 and into the passage 154 and to a position where the record column at the leading end thereof, which is its #1 record column, is in position to be sensed at the sensing station 107. This is referred to herein as its #1 column sensing position. As will presently appear, the stop plate 215 is moved into the path of the incoming new card and where it is engaged by the leading edge of the card, the card is thereby stopped and the stopped position of the card is its #1 column sensing position. When a card already occupies the passage 154 at the time the just mentioned mechanism commences its operation, the mechanism also functions to feed or eject such card from the passage 154 and from the read unit 100. Because of this latter function, this initial card feed mechanism is also referred to as the card eject mechanism and the cycle of operation of such mechanism to perform the functions just stated is called an eject cycle.

Power for operating the eject mechanism and other mechanisms of the read unit 100 is provided by a constantly running electric motor 106 (Fig. 1*b*) which drives a constantly running drive shaft DS by means of a pulley 119, belt 120, and pulley 121. A plurality of constantly running cams are fixed on the shaft DS and open and close, respectively, a plurality of related contacts during each revolution of the shaft DS. For the purposes of disclosing the present invention only five constantly running cam contacts are indicated diagrammatically in the drawings. They are identified, respectively, as CR3, CR4, CR5, CR6, and CR9 in Fig. 1*b* and in the wiring diagram of Figs. 6*a* to 6*c*, inclusive. The timing of opening and closing appears opposite each of these contacts in Figs. 6*a* to 6*c* and will be explained hereinafter in the description of the operation.

The initial card feed or eject mechanism, as before explained, effects during an eject cycle the feeding of a new card into the passage 154 and to its #1 column sensing position and effects the ejecting of any old card from the passage 154. The eject operating cycle is effected by the engagement of an eject clutch EJC (Fig. 1*b*) which occurs upon the energizing of the eject magnet EJM (see also Fig. 6*a*). The clutch EJC is of the one-revolution type and each time it is engaged it connects for one revolution the constantly running drive shaft DS with an eject cam shaft 134 and then disconnects the shafts DS and 134. A gear train composed of gears 123, 124, 126, 128, 129, and 131, connects the main drive shaft DS with a drive gear 133 of the clutch EJC. The clutch EJC is shown diagrammatically in Fig. 1*b* and is of a type well-known to those skilled in this art. For a complete description and showing of the clutch EJC see the copending application of Hamilton et al., referred to hereinabove.

The eject cam shaft 134 is connected to the driven side of the clutch EJC and is shown as being provided with eject control cams EC1, EC3, EC4, EC5, and EC7, and also with cams for operating eject contacts ECB1 and ECB2. Each time the eject cam shaft 134 makes a complete revolution these control cams and cam operated contacts effect the ejecting of any old card occupying the passage 154 and the feeding of a new card from the hopper into the feed passage 154 and to its #1 record column sensing position.

A revolution of the eject cam EC7 (Fig. 1*b*) clutches the feed roll drive shaft 141 to a constantly running gear 140 for the purpose of rotating the rolls 195, 196 so as to eject from the unit any card in the passage 154. The gear 140 is connected to the main drive shaft DS by a gear train comprising the gears 123, 124, 126, 135, 136, and 138. The cam EC7 operates the lever 698 which is pivoted at 699 and which in turn operates a second lever 682 pivoted on a pin 683 and formed with a forked lower end 685 engaging within an annular space 686 of a slidable clutch collar 681. The clutch collar 681 is connected to the roll drive shaft 141 so that the collar rotates with the shaft and at the same time may be slid longitudinally of the shaft. The collar 681 is formed at one end with a friction clutch disk 688 which is adapted to engage an annular friction surface 695 formed on the face of the constantly rotating gear 140. At its other end the collar 681 is formed with clutch teeth which in the normal position of the collar shown engage similar teeth formed on a hub of gear 691.

When the cam EC7 is rotated during the eject cycle as previously explained, the collar 681 is moved to the right as shown in Fig. 1b so as to disengage the clutch tooth connection between the collar 681 and the gear 691 and to effect frictional clutching engagement between disk 688 and the friction element 695 on the gear 140. The gear 140 will then drive the shaft 141 and the card feed rolls 195, 196. The timing of the cam shaft EC7 is such that the rolls commence to rotate at about 45° of the eject cycle and stop their rotation at about 186° of such cycle and the collar 681 is restored into full clutching engagement with the gear 691 at about 231° of the eject cycle.

One revolution of the eject control cam EC4 moves the card feed sectors 165, 166 from their lowermost position shown in full lines in Fig. 1a and Fig. 2 to their uppermost position shown in dotted lines in Fig. 2 from which they are then moved downward in a card feeding direction and return to their lowermost position. The cam EC4 is engaged by follower roller 635 which is carried by a lever 636 fixed to the transverse shaft 169. The card feed sectors 165, 166 are also fixed to the shaft 169 and move therewith. The timing of the cam EC4 is such that the sectors commence their upward movement at about 20° of the eject cycle and complete such upward movement at about 140° of the eject cycle. The downward feeding movement of the feed sectors commences at about 209° of the eject cycle and the sectors are restored to their lowermost normal position at about 310°.

A revolution of the eject cam EC3 moves the front pressure plate 155 of the hopper 104 rearwardly into engagement with the stack of cards in the hopper so as to press firmly the cards towards the rear wall 153 during the time the card feed sectors are being moved downward. Because of the pressure plate, the face of the sectors are assured an effective frictional engagement with the rearmost card HC-1 and the latter card is thus fed by the sectors downward through the throat 174 and into the passage 154. The cam EC3 effects movement of the plate 155 by a link and lever arrangement comprising a bell crank 283, a link 284, arm 285 fixed to a transverse shaft 286, and a second arm 290 fixed to such shaft and connected at its lower end by a spring 294 to the lower end of an arm 161. The lower end of the arm 161 is also connected to the plate 155 by means of a pin 160 fitting within an opening in a bracket member 163 fixed to the plate 155. The cam EC3 effects clockwise movement of the arm 290 as viewed in Fig. 1a and such movement of the latter stretches the spring 294, and thereby pulls the arm 161 clockwise and the latter effects rearward movement of the plate 155 into engagement with the cards in the hopper 104. The timing of the cam EC3 is such that the plate 155 commences its rearward movement at about 148° of the eject cycle and is in full pressure engagement with the cards at about 188°. The pressure is maintained until about 335° and the plate is restored to its forward position at the end of the cycle. From this it is apparent that the plate 155 is in full pressure engagement with the cards in the hopper during the entire time the card feed sectors 165, 166 are moving downward in a card feeding direction.

A revolution of the eject cam EC5 provides for moving the card feed roll 196 away from the roll 195 a slight distance so as to permit the new card to be positioned therebetween and also provides for moving the sensing bail 641 so as to move the sensing elements out of sensing relation with respect to the card feed passage 154 when the new card is being fed. The feed rolls are separated by a link and lever arrangement comprising a follower arm 643 pivoted on shaft 169, a link 644, arm 645 fixed to a transverse shaft 646, and arms 647 fixed to the two ends of the shaft 646 and engaging the levers 207 previously described as being pivoted on studs 205, 206 and rotatably supporting the shaft 198 of the roll 196. The sensing lever bail 641 is also operated from the cam EC4 through the shaft 646. An arm 654 fixed to the shaft 646 carries a pin which engages a flange on the upper outer end of an arm 657 fixed to the shaft 659. The shaft 659 carries arms 666 (see also Fig. 2) which support at their lower end the sensing lever bail 641. The timing of the cam EC5 is such that the roll 196 moves away from the roll 195 beginning at about 186° of the eject cycle and the full separating movement is effected at 231°. The roll 196 is returned into card feed relation with the roll 195 beginning at 310° and ending at 335° of the eject cycle. The timing of movement of the sensing bail is the same as the movement of the feed roll. That is, the bail commences to move the sensing levers out of sensing position at 186° and continuing to 231° and the restoring movement of the bail commences at 310° and ends at 335°. From the foregoing description of the card feed sector cam it is noted that the downward feeding movement of the sectors terminates at 310° and at this point in the cycle both the feed roll 196 is fully separated from the roll 195 and the sensing levers are completely out of sensing relation with respect to the passage 154.

The stop plate 215 determines the #1 column sensing position of the new card which is fed into the passage 154 from the hopper 104. The stop plate 215 is operated by the eject control cam EC1 through a link and lever arrangement composed of bell crank 259 pivoted on shaft 169, a link 261, an arm 262 fixed to transverse shaft 216 and to which the stop plate 215 is also fixed. The timing of cam EC1 is such that the stop plate 215 is moved from its normal position, shown in full lines in Fig. 1a and in dotted lines in Fig. 2, to its card intercepting position, shown in full lines in Fig. 2, commencing at about 210° of the eject cycle and ending at 230° of the cycle. The stop plate remains at its intercepting position across the passage 154 until 335° of the cycle, and is restored to its normal position shown in dotted lines in Fig. 2 at about 353° of the cycle. From the foregoing it is apparent that the stop plate 215 is moved to its intercepting position after the feed rolls 195, 196 have fed out of the passage 154 any old card occupying such passage and the plate occupies its intercepting position while the card feed sectors 165, 166 are moving downward to feed the new card into the passage. When the sectors 165, 166 effectively feed the new card downward the leading edge of the new card engages and is stopped by the upper intercepting edge of the stop plate 215 at about 297° of the eject cycle.

Fig. 2 shows in full lines the position of the parts after the card HC-1 has been properly fed from the hopper 104. The parts are shown at about 335° of the eject cycle. The stop plate 215 is still in its intercepting position, the rolls 195, 196 have been restored to card feeding relation, the sensing bail 641 has returned the star wheel sensing elements 770 into sensing relation with respect to the card in the passage 154, and the leading edge of the new card HC-1 engages the intercepting edge of the stop plate 215 and thereby occupies its #1 column sensing position.

As will appear more fully hereinafter, the principal purpose of the present invention is to prevent further normal operations of the apparatus in case the card fed from the hopper should fail to reach the #1 column sensing position.

*Normal record feeding and sensing.*—With a record card properly positioned at the sensing station 107 at the end of the eject cycle, the card may be correctly sensed and advanced column-by-column past the sensing station 107 for successive column sensing, by the operation of a normal card feeding and sensing means. The operation is such that for each normal operating cycle of the read unit 100 in which the normal card feeding and sensing means is activated, the record column at the sensing station 107 is sensed and the card is then fed to bring the next succeeding record column into sensing position. It is noted that a normal operating cycle of the read unit 100 corresponds to one revolution of the main drive shaft DS. Activation of the normal sensing and feeding means is effected by the engagement of a card feed clutch CFC (Fig. 1*b*) and the latter is effected by the energizing of the card feed clutch magnet CFM (see also Fig. 6*a*). The selective control of the energizing of magnet CFM and the timing of the operation will be explained hereinafter in the description of the operation in connection with the wiring diagram of Figs. 6*a* to 6*c*, inclusive.

The card feed clutch CFC is of a type well-known to those skilled in this art. The clutch is shown diagrammatically in Fig. 1*b*. For a complete showing and description of the details reference may be had to the copending application of Hamilton et al., identified hereinabove.

The driving element of the clutch CFC is driven continuously by the gear 124 which is the same size as and is in mesh with the gear 123 fixed to the continuously operating drive shaft DS. The driven element of the clutch comprises a pawl pivoted on a disk fixed to the card feed shaft 125. The driving element has a single radial notch which receives the pawl when the magnet CFM is energized. The result is that the clutch always engages at one particular point in the rotation of the shaft DS and the shaft 125 rotates at the same speed as the shaft DS.

Power transmitting mechanism connects the card feed shaft 125 and the gear 691 and provides for driving the card feed roll shaft 141 with an intermittent motion so as to feed the card in sensing position a distance equal to one record column for each revolution of the shaft 125 and shaft DS, which, as stated, corresponds to one normal operating cycle. The power transmitting mechanism includes a conventional Geneva drive GM comprising a drive roller 740 carried by a disk 742 fixed to the shaft 125, a Geneva star wheel 743, having six radially disposed slots 745, and a locking disk 747. The power transmitting mechanism also comprises a gear 752 fixed to the Geneva wheel 743 and meshing with gear 753, a differential mechanism DM including an output shaft 137, and meshing gears 763, 764, and 691. The gear 753 drives one sun gear 755 of the differential mechanism. The other sun gear 756 is held stationary during normal card feeding and sensing operations by means not shown herein as it is not necessary to an understanding of the present invention. The planet gears 758 mesh with sun gears 755 and 756 and are mounted on a planet arm fixed on the output shaft 137 and extending through the axis thereof.

As shown in Fig. 1*b*, the drive roller 740 of the Geneva is within a slot 745 of the wheel 743 for about 120° of each revolution of the shaft 125. As explained previously, the clutch collar 681, except during an eject cycle, occupies the position shown in Fig. 1*b*, where it is clutched to turn with the gear 691. Thus, during about 120° of each normal cycle when the card feed clutch is engaged, the feed roll shaft 141 and the feed roll shaft 198 (through gears 210, 211), are rotated. The amount of movement of the feed rolls 195, 196 which is determined by the speed reduction in the power transmitting mechanism, is just enough to advance the record card one record column for each cycle. The timing is such that the card is moved beginning at about 240° of a normal card feeding cycle and ending at about 360° of such cycle.

It is noted that the contacts CF1 (Fig. 1*b*) are actuated by a cam fixed to the card feed shaft 125. As will later appear, these contacts CF1, when closed, permit current to flow through the sensing circuits which include the sensing contacts SC1 to SC12, inclusive. (See also Fig. 6*a*.) The contacts CF1 close at about 30° of each normal card feed cycle and open at about 180° of each such cycle.

*Program tape feed.*—After the unit 100 has gone through an eject cycle which, as explained, provides for feeding a new card to its #1 column sensing position, the sequence of operations of the apparatus is then controlled according to a predetermined plan by the code designations in the program tape 15. At the end of an eject cycle, the tape 15 is positioned with its #2 column at a tape sensing station 108 (Fig. 1*a*). A row of sensing brushes extends across the tape at the sensing station, there being one brush for sensing each index point position of each row in the sections A, B, and C. In Fig. 1*a*, only the six brushes BA1 to BA6, inclusive, which sense, respectively, the six index point positions of section A of the tape are shown. All sixteen of the sensing brushes are indicated diagrammatically in Fig. 6*a*, but only the operation in connection with section A and the brushes BA1 to BA6, inclusive, will be described herein because a complete description of all sensing operations is not necessary to an understanding of the present invention.

Mechanism is provided for advancing the program tape one column for each normal operating cycle which, as stated, comprises one revolution of the shaft DS. This mechanism comprises a tape feed clutch TFC (Fig. 1b) which is operated by the energizing of a magnet TFM and functions to connect a constantly running shaft 130 to a gear 144 which has a driving connection with a tape feed drive shaft 151 (Fig. 1a). The shaft 130 is connected to the constantly running drive shaft DS by a gear train comprising the gears 129, 128, 126, 124, and 123. The gear 144 is connected to the tape feed drive shaft 151 by a motion transmitting means comprising gears 145 and 147, shaft 148, and gears 149 and 150 (Fig. 1a).

The tape feed clutch TFC is shown diagrammatically in Fig. 1a and will be recognized by those skilled in this art as being of a well-known type. For a full disclosure thereof reference may be had to the copending application of Hamilton et al., identified hereinabove. Generally, the clutch TFC comprises a 10-tooth driving disk 825 fixed to the end of shaft 130, a driven disk 827 rotatably mounted on shaft 130 and fixed to gear 144, a latching wheel 834 rotatably mounted on shaft 130 between the disks 825 and 827 and having ten peripheral latching teeth, and a pawl 828 adapted to have clutching engagement with the disk 825 and pivoted on a stud extending from the driven disk 827 and between spokes of the latching wheel. When the magnet TFM is deenergized the end of its armature engages a peripheral tooth of the wheel 834 and a spoke of the latter engages a pin on the pawl 828 and thereby holds the latter out of clutching engagement with the disk 825. When the magnet is energized, the wheel 834 is released and the latter releases the pawl 828 which engages a tooth of disk 825 and thereby clutches the parts together.

*Operation.*—The operation and functions of the preferred embodiment will now be described in connection with the wiring diagram disclosed in Figs. 6a, 6b, and 6c. In following the description of the operation in connection with the wiring diagram, the Figs. 6a, 6b, and 6c should be arranged in end-to-end relation and in the order named.

In the diagram all switches are shown in their off position and all relay contacts are shown in the position they occupy with their related relay coils deenergized. The constantly running cam contacts CR3, CR4, CR5, CR6, and CR9 are shown in the diagram in the position they occupy at the 0° or 360° position of a normal operating cycle and alongside each of the latter contacts is a legend indicating the time in each normal cycle at which the contacts make and break. The card feed cam contacts CF1 are shown in the position they occupy when the card feed clutch CFC is disengaged. The make and break time of contacts CF1 in a normal cycle when the clutch CFC is engaged, is also indicated in the diagram alongside of the contacts. The eject cam contacts ECB1 and ECB2 are shown in the positions they occupy with the clutch EJC disengaged. The time the contacts ECB1 and ECB2 make and break during an eject cycle is also indicated in the wiring diagram alongside such contacts.

To start operation, the main power switch MS (Fig. 6a) and the motor switch SW#3 (Fig. 6b) are both closed. The switch MS connects a suitable direct current power supply to a main positive conductor 900 extending along the left-hand side of the diagram and to a main negative conductor 901 at the right of the diagram. The switch SW#3 closes an energizing circuit for the motor 106 which extends across the power conductors 900 and 901.

With the motor 106 running, an eject cycle is effected to feed the rearmost card HC-1 from the hopper 104 (Fig. 1a) to its #1 column sensing position in the passage 154, as before explained. An eject cycle is effected by energizing the eject control relay R13 (Fig. 6c) which then closes its contacts R13-4 (Fig. 6a) to establish an energizing circuit for the eject clutch magnet EJM. Provision is made for energizing R13 in either of three ways; viz., by placing a card or cards in the hopper 104 when there is no card in the passage 154; by manually depressing an eject key EJK (Fig. 6b); or by the sensing of a significant code designation in the program tape 15.

In placing a card or cards in the hopper 104, when there is no card in the passage 154, a card lever 224 (Fig. 1a) is engaged and is moved downward to close hopper contacts HC (see also Fig. 6c), with the result that the latter establish an energizing circuit for the pick up coil of R13. The card lever 224 is fixed on a shaft 223 and extends across the lower part of the hopper. The placing of a card, or cards, in the hopper moves the card lever 224 downward to a slight degree. The latter rotates the shaft 223. An arm 225 on the outer end of shaft 223 is rotated clockwise enough to release the movable blade of the hopper contacts HC and the inherent spring force in the movable blade is enough to close the contacts HC. In Fig. 1b, the cards are shown as being inserted in the hopper and just before they move the card lever 224 and close the contacts HC as just explained. The circuit closed by the contacts HC (Fig. 6c) extends across the supply conductors 900 and 901 and includes the normally closed card lever relay contacts R229-2.

The manual depressing of the eject key EJK (Fig. 6b) closes contacts which establish an energizing circuit for the pick up coil of relay R220. This circuit extends across the conductors 900 and 901 and also includes the constantly running cam contacts CR3. In a manner which will later appear, the sensing of a code designation in the tape 15 selected for signifying an eject operation, results in the energizing of a predetermined one or ones of the tape code set up relays R188 to R193, inclusive (Fig. 6a), and the energized relay or relays adjust their contacts in the pyramid network of Figs. 6b and 6c and thereby condition an energizing circuit path therethrough which also includes the contacts CR3, the normally closed contacts R14-4 of the main interlock control relay R14, and a predetermined one of the outlet terminal hubs of the pyramid network. A plug connector connecting such one outlet hub with the function hub FH4 will include the pick up coil of the relay R220 in the conditioned circuit path through the pyramid network. As an example a plug connector 982 is shown connecting the terminal hub PRH22 with the function hub FH4. The relay R220 when energized either by depressing the key EJK or by the sensing of a significant code designation in the tape 15, as just explained, closes its contacts R220-2 (Fig. 6c) and thereby establishes an energizing circuit for the pick up coil of the eject control relay R13. R220 also closes its hold contacts R220-6 to establish an energizing circuit for its hold coil which includes the cam contacts CR9.

In describing the present invention, it will be assumed that no card occupies the passage 154 (Fig. 1a) and that the eject operation is effected by placing cards in the hopper 104 which results in the card lever 224 closing the hopper contacts HC and energizing the pick up coil of R13 (Fig. 6c), as explained above. In addition to closing its contacts R13-4 (Fig. 6a) and energizing the eject clutch magnet EJM, R13 also closed its hold contacts R13-1 (Fig. 6c) and establishes an energizing circuit for its hold coil which includes the normally closed eject cam contacts ECB2. Thus, the relay R13 remains energized until 335° of the eject cycle when the contacts ECB2 open to break the hold circuit for R13. The eject magnet EJM then deenergizes and permits the eject clutch EJC to latch up at the end of one revolution of the shaft 134, in the manner previously explained.

The eject control relay R13 also closes its contacts R13-2 and thereby energizes the pick up coil of main interlock control relay R14. A hold circuit for R14 is established through its hold contacts R14-2 and the constantly running cam contacts CR9. This hold circuit is useful at the end of the eject cycle for holding R14 deenergized through the end of the eject cycle and until 50° of the following normal cycle. At 335° of the eject cycle ECB2 open to drop out R13 which then opens its contacts R13-2 and thereby drops out the pick up coil of R14. At this latter time CR9 is closed and holds R14 energized until CR9 opens at 50° of the next normal cycle. The normally closed interlock contacts of R14 are thus opened during the eject cycle to prevent the establishing of sensing circuits and other circuits which should not be established during this time. Contacts R14-1 (Fig. 6a), when open, prevent the establishing of sensing circuits through the program tape. The opened points of R14-3 prevent the energizing of the card feed magnet CFM. Contacts R14-4 (Fig. 6b), when open, prevent the establishing of energizing circuits through the pyramid network.

The mechanical operation which takes place during the eject cycle has been explained hereinabove under the heading, "Feeding of Record to Initial Sensing Position." It is noted that as the card HC-1 is fed downwardly through the throat 174 into the passage 154, the card lever 224 continues to be moved by the card from its position shown in Fig. 1a to its position shown in Fig. 2. In moving to the latter position, the card lever 224 (Fig. 1a) rotates the shaft 223 still further in a clockwise direction and so that the hook-shaped arm 226 on the outer end of the shaft 223 moves the movable blade of contacts CLC sufficiently to close the contacts CLC. As long as a card remains in the passage 154 the lever 224 remains in the position of Fig. 2 and the contacts CLC remain closed. The closed contacts CLC (Fig. 6c) establish an energizing circuit for the pick up coil of the card lever control relay R229 and the latter then closes its hold contacts R229-6 to establish a circuit for its hold coil including the eject cam contacts ECB2 which are closed at 355° of the eject cycle and remain closed until the card is ejected from the passage 154 during the next eject cycle. R229 also opens its contacts R229-2 and thereby breaks the energizing circuit for the pick up coil of R13 which includes the hopper contacts HC. R229 closes its contacts R229-1 (Fig. 6a) to condition sensing circuits for the program tape 15, and closes its contacts R229-4 to condition sensing circuits for the card HC-1 in the passage 154.

At the end of the eject cycle, the card HC-1 normally occupies its #1 column sensing position and the tape 15 is in position to have its #2 column sensed. The succeeding normal operations of the apparatus take place in the manner fully explained in the application of Hamilton et al., referred to above, and such succeeding operations are effected under the control of the control designations in the tape 15 and of the designations in the card HC-1.

In the eject cycle, it sometimes happens through accident or carelessness on the part of the operator in placing the cards in the hopper, that the new card being initially fed does not reach its #1 column sensing position. With a card thus improperly positioned initially, the normal succeeding operations of the apparatus will result in the data in the card being improperly manifested and in spoiling the work. Obviously, it takes time and costs money to replace the copy and the amount of time wasted will depend to some extent upon how soon the error is detected.

In accordance with the present invention, provision is made herein for immediately and automatically stopping further normal operations of the apparatus when a card has not been properly fed during an eject cycle. In fact, when a card is not properly fed initially to its #1 column position, normal operations are stopped before any printing or other kind of manifesting can be done, with the result that no work is spoiled and all that is then required is to eject the card and reinsert it in the hopper in its proper sequence.

With the closing of contacts R229-1 and R14-1, a sensing circuit is conditioned for the column #2 of the program tape which, as described, is now in sensing position. As shown in Fig. 5, column #2 of section A of the tape contains a code hole in its #1 index point position. This is the code designation for turning on the tape feed. This circuit extends from the positive conductor 900 and includes the cam contacts CR5, contacts R229-1 and R14-1, the common brush 863 engaging the electrically conductive tape feed roll 102, the code hole in the #1 index position of section A of the tape, the sensing brush BA1, and the pick up coil of tape code set up relay R188 to the negative conductor 901. This circuit is established by CR5 at 295° of the normal cycle in which CR9 (Fig. 6c) opened to drop out R14. The relay R188 is held energized until 230° of the following cycle by a hold circuit including CR6 (Fig. 6a); R188-4, now closed; and the hold coil of R188.

R188 transfers its contacts R188-1 (Fig. 6b) and thereby conditions a program control circuit through the pyramid network previously referred to, and including the program outlet hub PRH1, the plug connector 908, function hub FH19, and the pick up coil of the program-feed-on relay R218. This conditioned program control circuit is closed by CR3 at 80° of the normal cycle following the one when R188 was energized. The relay R218 is held energized by a circuit including the normally closed eject cam contacts ECB1 (Fig. 6a), the normally closed contacts R219-1 of the program-feed-off relay R219, the hold contacts R218-4 of R218, and the hold coil of R218. Thus, the program-feed-on relay R218 will remain energized until the next eject cycle when card HC-1 is ejected from the passage 154 and contacts ECB1 open, or, until the program-feed-off relay R219 is energized and opens its contacts R219-1.

R218 closes its contacts R218-1 and thereby conditions an energizing circuit for the tape feed clutch magnet TFM which is under the control of cam contacts CR5. This circuit extends from the positive conductor 900, through now closed contacts R229-1 and R14-1, wire 914, now closed contacts R218-1, and the magnet TFM. Thus, this circuit is pulsed or closed by CR5 at 295° of each normal cycle and opened at 360° of such cycle. The operating timing of the clutch TFC is such that the clutch pawl engages a tooth at 360° and is disengaged at 90° of the following cycle. Thus, the tape 15 moves from 360° and until 90° of the next cycle and each cycle thereafter as long as R218 remains energized. The amount of tape movement in each cycle is just enough to bring the next or succeeding column of the tape 15 into sensing position under the sensing brushes. At 295° of each cycle CR5 closes to sense the column of the tape 15 at sensing position.

It is noted that as the tape 15 does not move from the #2 column sensing position until the end of this first cycle when the magnet TFM was energized, column #2 is again read when CR5 closes to energize the magnet TFM. This will not affect the operation in this first cycle, however, as all that happens is that the circuit through the pyramid network including the pick up coil of R218 is again energized. As the hold coil of R218 is already energized nothing additional will happen.

Column #3 of the tape 15 (Fig. 5) is read at 295° of the following cycle and the code hole in the #3 index point position, when sensed, results in energizing the tape code set up relay R190 and the consequent conditioning of a program control circuit through the pyramid network of Figs. 6b and 6c which includes the program outlet hub PRH3 (Fig. 6c), the plug connector 915, function hub FH33, and the pick up coil of the card-feed-on relay R11. When CR3 closes at 80° of the next cycle R11 is thus energized. R11 is then held energized by a circuit including the eject cam contacts ECB1 (Fig. 6a), the normally closed contacts R12-1 of the card-feed-off relay R12, the hold contacts R11-1, and the hold coil of R11. R11 also closes its contacts R11-3 and thereby establishes an energizing circuit for the card feed clutch magnet CFM. The card feed clutch CFC engages at the end of the cycle when R11 is energized and the card feed shaft 125 then begins to turn with the cycle following. At 30° of this following cycle, the card feed cam contacts CF1 (Fig. 6a) close to establish sensing circuits through the card sensing contacts SC1 to SC12, inclusive, the latter being opened or remaining closed, depending upon the particular code combination in the #1 column of card HC-1 now at the sensing station 107.

It is noted that, in the commercial application disclosed in the Hamilton et al. application, referred to above, and in the preferred embodiment disclosed herein, the first or #1 column of each card has a code hole signifying the classification to which such card belongs. In the normal operation, the card is classified at this point in the program and this classifying of the card controls subsequent operations of the apparatus as is fully disclosed in Hamilton et al. As shown, in Fig. 4, the particular card HC-1 which has been shown herein as a typical example, contains a code hole in the #1 index point position of its column #1 and such code signifies that the card is a heading card belonging to class #1.

The fact that column #1 of each card always contains a code hole in one of its index point positions, is used herein, in conjunction with control circuits to be described, to effect the automatic stopping of the operation of the apparatus when the initial card feeding operation does not properly position the card at its #1 column sensing position.

Referring back to the cycle in which the card-feed-on relay R11 was energized by CR3 at 80° and in which the card feed clutch CFC was engaged at the end of such cycle; it is noted that when CR5 closed at 295° of such cycle, column #4 of the tape 15 was sensed. As shown in Fig. 5, tape column #4 contains code holes in the #2, #3, and #4 index point positions of section A thereof. The sensing of this column by the closing of CR5 results in the energizing of tape code set up relays R189, R190, and R191 in the same manner as in previously described tape sensing operations. R189, R190, and R191 then adjust their contacts in the pyramid network and thereby condition a program control circuit therethrough which includes program outlet hub PRH32 (Fig. 6c), plug connector 916, hub 917, and the coil of distributor relay R247. This conditioned program control circuit is closed by CR3 (Fig. 6b) at 80° of the cycle following the sensing of column #4 of the tape and this following cycle is the same as the one in which the card feed cam contacts closed at 30°, as described above, to establish sensing circuits through the card sensing contacts SC1 to SC12, inclusive.

The distributor relay R247 (Fig. 6c) has two sets of contacts identified as R247-1 and R247-2, respectively. The set of contacts R247-1 is connected by a plug connector 923 to function hub FH37 which is wired to the negative conductor 901 through the coil of the card-feed-off relay R12, and the set of contacts R247-2 is connected by a plug connector 921 with function hub FH21 which is wired to conductor 901 through the coil of the card-classify relay R18. Cam contacts CR4 close at 100° of the cycle in which R247 is energized and thereby establishes energizing circuits through R247-1 and R247-2 for the relays R12 and R18, respectively.

Thus, the card-classify relay R18 is energized during the same cycle as contacts CF1 close to sense the #1 column of the card. R18 closes its contacts R18-1 to establish a classifying circuit which includes the #2 contacts of each of the twelve card code set up relays R101 to R112, inclusive, and card-classify hubs CH1 to CH12, inclusive. The plugged classifying circuit network at the negative side of the card-classify hubs has not been included herein as a disclosure thereof is not necessary to an understanding of the present invention. The beginning of such network has been indicated in Fig. 6c by broken plug connectors. For a full disclosure of the network reference may be had to the Hamilton et al. application, referred to above.

In a normal operation when the card HC-1 has been properly positioned at the #1 column sensing position by the eject operation, the #1 column of the card is sensed. In the example being described column #1 of card HC-1 (Fig. 4) is sensed and this column contains a code hole in its #1 index point position. As a result, sensing contacts SC1 (Fig. 6a) are closed and the contacts CF1 when closed establish an energizing circuit through contacts SC1 and the pick up coil of the related card code set up relay R101. R101 then closes its hold contacts R101-6 to establish an energizing circuit for its hold coil including the cam contacts CR6. R101 also closes its classify contacts R101-2 (Fig. 6c) to establish a classifying circuit through the now closed contacts R18–1. As it is assumed that the card HC–1 is properly positioned at the #1 column sensing position, normal operations of the apparatus will continue in the manner fully disclosed in the Hamilton et al. application, referred to above.

According to the present invention, if the card is not initially placed properly at its #1 column sensing position, the closing of the card-classify relay contacts R18–1 will establish an energizing circuit for the program-feed-off relay R219 (Fig. 6b) which will then open its contacts R219–1 (Fig. 6a) in the hold circuit previously described for the program-feed-on relay R218. R218 will then become deenergized and open its contacts R218–1 in the pulsing circuit for the tape feed magnet TFM. This will latch up the tape feed clutch TFC and thereby stop further normal operations of the apparatus.

When the relay R219 is energized, as just explained, the only way to start normal operations again is for the operator to effect an eject operation which will eject the card from the passage 154 if the card has previously reached the feed rolls 195, 196 (Fig. 1a). If not, the feed sectors 165 and 166 will feed the card against the stop 215. When the card reaches and is stopped by the stop plate 215, further movement of the feed sectors will simply cause the friction feeding surfaces of the sectors to slip over the surface of the card. It is noted that the tape 215 is homed or moved to its #2 column sensing position as a part of each eject operation by mechanism not disclosed herein as it is not necessary for an understanding of the present invention. Consequently, at the end of the eject operation, normal operations commence again in the same manner, as described above. Thus, the operator is notified by the stopping of the machine when a new card is not properly initially fed to the #1 column sensing position and the operator can then take care of the matter without work being spoiled.

The manner in which the failure of the card to be initially fed to the #1 column sensing position energizes the program-feed-off relay R219 will now be described. A failure of the card to be properly fed initially would result in either of two conditions. Either the leading edge of the card would reach a position in the passage 154 where all of the sensing elements would engage the marginal portion of the card marked E in Fig. 4 which is before reaching the #1 column, or the card would stop in a position where the sensing elements would not contact the card at all. In the first condition none of the sensing contacts SC1 to SC12, inclusive, would close as the sensing elements would all engage the imperforate marginal part E of the card, and in the second condition all of the sensing contacts would close as the sensing elements would not engage the card at all. Provision is made herein for energizing R219 when either of these two conditions occur in the part of the program of operations where the first card column is sensed.

Should the card not be fed completely against the stop plate 215 with the result that the sensing elements all engage the marginal portion E of the leading edge of the card, none of the sensing contacts will be closed and consequently none of the card code set up relays will be energized. With this condition an energizing circuit for R219 will be established which is traced as follows: From the positive conductor 900; a wire 1000 (Fig. 6c); now closed card-classify relay contacts R18–1; a wire 1001 (see also Fig. 6b); the serially connected normally closed contacts R101–5 to R111–5 of the card code set up relays R101 to R111, inclusive, which are not now energized; a wire 1002; the normally closed points of transfer contacts R112–9 of the card code set up relay R112; and through the coil of R219 to the negative conductor 901. As this energizing circuit for R219 contains normally closed contacts of all twelve of the card code set up relays, such circuit can be closed only when all twelve of the card code set up relays are not energized. The manner in which the relay R219 deenergizes the program-feed-on relay R218 (Fig. 6a) and stops normal operation of the apparatus has been described hereinabove.

Should the new card not be fed during the initial eject operation far enough for the sensing elements to contact the edge of the card, then all sensing contacts SC1 to SC12, inclusive, will be closed and all related card code set up relays R101 to R112, inclusive, will be energized by CF1 (Fig. 6a) when the latter close to sense the #1 column. With this condition the program-feed-off relay R219 (Fig. 6b) will be energized by a circuit traced as follows: From the positive conductor 900; contacts CR3; now closed contacts R14–4; a wire 1003; the now closed contacts R110–9 and R111–9 of card code set up relays R110 and R111; the now closed points of transfer contacts R112–9 of the card code set up relay R112; and thence through the coil of the program-feed-off relay R219 to the negative conductor 901.

It is noted that the normally open contacts of only three of the card code set up relays, R112, R111, and R110 are used in the last described circuit for energizing the program-feed-off relay R219, because the combination of code holes in the #12, #11, and #0 positions are never used in the commercial application of the invention described, to designate data or control operations and consequently these relays are never energized together at any time a card is at the sensing station 107. Normally open contacts of the remaining nine card code set up relays could also be used in this circuit, but they would be superfluous as the three used when energized at one time accurately signify that there is no card at the sensing station.

It is also noted that normally closed contacts R112–8, R111–8, and R110–8 (Fig. 6c) of the card code set up relays R112, R111, and R110, respectively, are connected in parallel between the card classify relay contacts R18–1 and the classifying contacts R101–2 to R112–2, inclusive, of the card code set up relays. The purpose of these contacts, R112–8, R111–8, and R110–8, is to prevent the energizing of any of the circuits in the card classifying network previously referred to, when the card is not initially fed far enough in the passage 154 for any part thereof to be engaged by the card sensing elements.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In apparatus of the type described, the combination of means providing a passage for receiving a record containing data-representing designations; means determining an initial record sensing position in said passage; initial record feeding means operable to feed records one at a time into said passage and to said initial record sensing position; sensing means operable upon a completion of the operation of said initial feeding means and normally effective to sense initially a part of the record at said initial position and operable thereafter to sense remaining parts of said record, said sensing means also being effective to sense the absence of a properly positioned record in the event said initial record feeding means fails to feed a record accurately into said initial position; and means controlled by said sensing means and operable to prevent normal succeeding operations of said apparatus in the event said initial record feeding means fails to feed a record accurately into said initial sensing position.

2. Apparatus according to claim 1 wherein the means determining said initial record sensing position comprises a stop element normally occupying an inactive position outside of said passage and being movable, upon operation of said initial record feeding means, to an active position across said passage where it intercepts and stops the record being initially fed and said stop being movable back to its said inactive position at the completion of operation of said initial record feeding means.

3. In apparatus for manifesting data contained in source records as data-representing designations, the combination of means providing a record feeding and sensing passage; means determining an initial record sensing position in said passage; initial record feeding means operable to feed a record into said passage and to said initial sensing position; normal record sensing and feeding means operable in steps and effective during each operating step to sense a recording area of said record for the presence of a data-representing designation and to advance said record so as to bring a recording area into sensing position; programming means operable to effect succeeding operations of said apparatus according to a predetermined plan; means effecting operation of said initial record feeding means; means effective upon the termination of operation of said initial feeding means for initiating operation of said programming means; means controlled by said programming means for operating said normal sensing and feeding means; and means controlled by the initial sensing operation of said normal sensing and feeding means, for stopping operation of said programming means when the record fed into said passage by said initial feeding means does not properly occupy said initial record sensing position, and in such a manner that further normal operation of said apparatus is prevented.

4. In apparatus for manifesting data contained in source records as data-representing designations, the combination of means providing a record feeding and sensing passage; initial record feeding means operable to feed a record into said passage; means comprising a stop element normally occupying an inactive position outside of said passage and being movable, upon operation of said initial feeding means, to an active position across said passage where it intercepts and stops at an initial record sensing position the record being initially fed, and said stop element being movable back to its said inactive position upon completion of operation of said initial record feeding means; normal record sensing and feeding means operable in steps and effective during each operating step to sense a recording area of said record for the presence of a data-representing designation and to advance said record to a position where a recording area is in sensing position; programming means operable to effect succeeding operations of said apparatus according to a predetermined plan; means effecting operation of said initial record feeding means; means effective upon the termination of operation of said initial feeding means for initiating operation of said programming means; means controlled by said programming means for operating said normal sensing and feeding means; and means controlled by the initial sensing operation of said normal sensing and feeding means for stopping operation of said programming means when the record fed into said passage by said initial feeding means has not reached said stop element, whereby further normal operation of said apparatus is prevented.

5. In apparatus of the class described, the combination of record sensing means adapted to sense records containing data-representing designations, record feeding means normally operable to feed records one at a time to an initial sensing position relation to said record sensing means, first operating means coordinated with said record feeding means for operating said sensing means to test for the presence of a record in said initial sensing position at a time when a record normally would occupy such position, second operating means normally effective following the operation of said first operating means to produce relative movement between said sensing means and said record for causing said sensing means to sense various parts of said record in sequence, and control means responsive to said sensing means for disabling said second operating means in the event said sensing means does not detect a record in said initial sensing position.

RICHARD J. WHALEN.
STANLEY T. KULPA.

REFERENCES CITED

The following references are of record in the file of this patent:

UNITED STATES PATENTS

| Number | Name | Date |
|---|---|---|
| 1,991,729 | Brougham | Feb. 19, 1935 |
| 2,403,550 | Rabenda et al. | July 9, 1946 |

Certificate of Correction

Patent No. 2,569,840 October 2, 1951

RICHARD J. WHALEN ET AL.

It is hereby certified that error appears in the printed specification of the above numbered patent requiring correction as follows:

Column 20, line 39, for "relation" read *relative*;

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*